March 11, 1969     G. A. RAUSING ET AL     3,431,700
APPARATUS FOR MANUFACTURING STERILE PACKAGES
STARTING FROM A FLATTENED TUBE HAVING A
STERILIZED INNER SURFACE
Filed Jan. 25, 1966
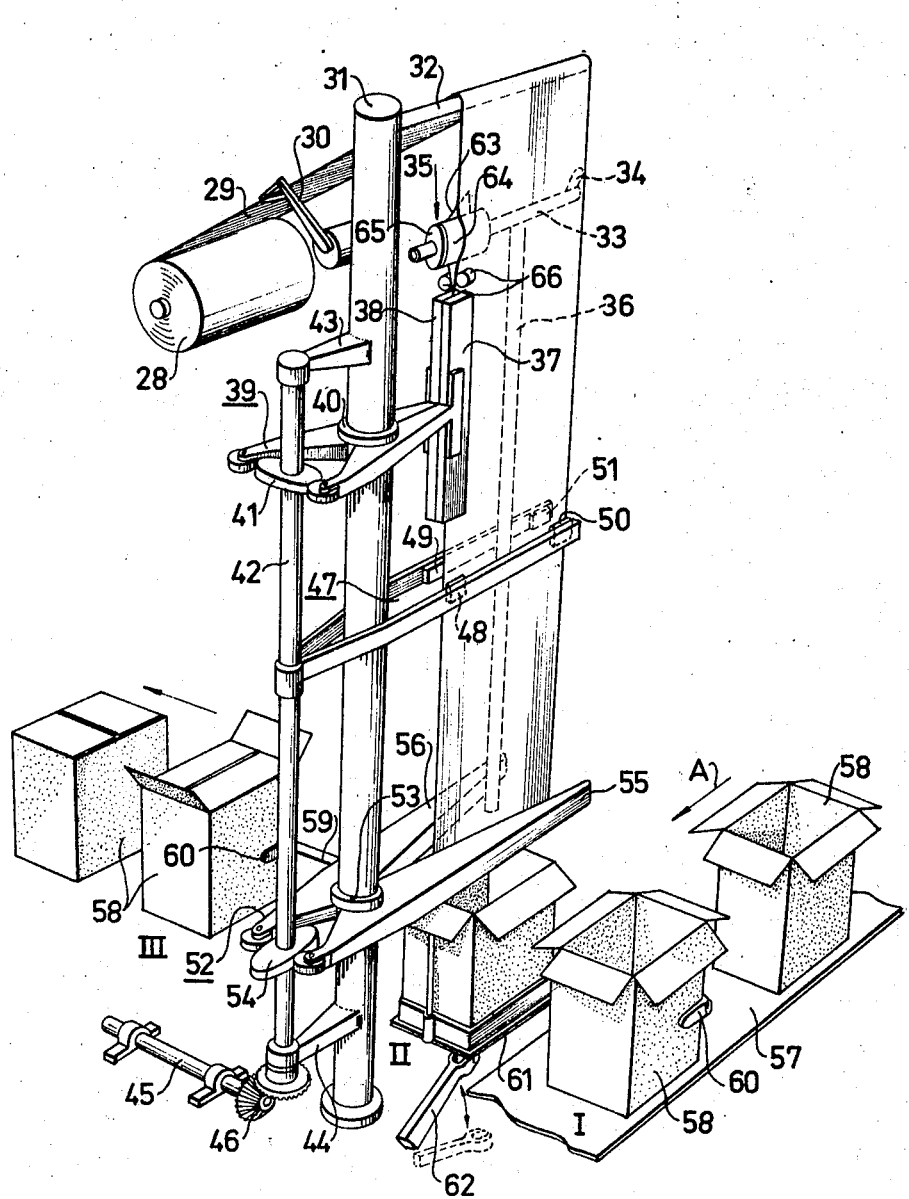
INVENTORS United States Patent Office 3,431,700
Patented Mar. 11, 1969

3,431,700
APPARATUS FOR MANUFACTURING STERILE PACKAGES STARTING FROM A FLATTENED TUBE HAVING A STERILIZED INNER SURFACE
Gad Anders Rausing and Harry Sigvard Valdemar Järund, Lund, Sweden, assignors to AB Tetra Pak, Lund, Sweden, a Swedish company
Filed Jan. 25, 1966, Ser. No. 522,943
Claims priority, application Switzerland, Feb. 19, 1965, 2,343/65
U.S. Cl. 53—182      6 Claims
Int. Cl. B65b 9/12, 51/30

ABSTRACT OF THE DISCLOSURE

Apparatus for making and filling containers with a fluent material in a sterile manner comprises pre-formed continuous flattened tubing of a thermoplastic material having its inner surface in a sterile condition which is fed past a slitting knife to open up a narrow slit at one side edge of the tube to receive a filling pipe. This filling pipe is surrounded by a porous body from which a disinfectant emanates, the slit-open edges of the tubing continuously wipe opposite surfaces of the porous body to maintain the desired sterility characteristic, and the edges of the tubing are immediately resealed after passing the filling pipe and its surrounding porous body.

---

The present invention relates to an improvement in apparatus for manufacturing sterile packages starting from a a roll or other suitable supply source of generally flattened tubing with a sterile inner side, by flat-pressing and sealing in transverse zones in relation to the longitudinal direction of the tubing, the filling material of the packages being introduced into the tubing by means of a filling pipe through a slit cut open in the same. The principal characteristic of the method according to the invention is that the cut-open slit edges are coated with a disinfectant in the region where the filling pipe is introduced, whereup the slit is closed and sealed. Thereby it is ensured under normal conditions that bacteria cannot penetrate into the hose. This may be further ensured by measures which will be disclosed in the following description.

The apparatus according to the invention includes a supply of tubing with a sterile inner side, means for advancing this tubing past a slitting and filling device, which is provided with a cutting knife for slitting the tubing open and with a filling pipe for directing a liquid or flowing filling material through the slit obtained, and means for closing the slit and for transverse sealing of the packages. The principal characteristic of the device according to the invention consists of a preferably porous body situated adjacent the filling pipe, said body being adapted to receive disinfectant on its surface and placed so that the edges of the slit are compelled to sweep it before the slit is closed and sealed.

Preferably, the said body consists of an annular porous body threaded on the filling pipe adjacent the slit, said body being provided with an inner inlet for the disinfectant and being confined on the outside by an annular sealing disk. If one operates with an over-pressure inside the tubing, i.e. a pressure greater than that of the surrounding atmosphere, the disinfectant is forced by this pressure under the guidance of the sealing disk out to the peripheral surface of the body, whereby the slit edges running in contact with the latter are efficiently coated with the disinfectant. Through the inner over-pressure in the tubing it is at the same time achieved that an outward air current is obtained around the disinfection body, whereby it is further ensured that bacteria cannot be introduced into the tubing.

Further advantages gained by the invention will be apparent from the following description of a preferred embodiment of the invention which is shown in the accompanying drawing, the single view of which shows the apparatus in perspective.

In the drawing, the invention is illustrated as applied to the manufacture of an inner bag intended for a cardboard package, said inner bag being detached from and filled through a tubing having a sterile inner side to be thereupon put down into an outer package which consists of a shell set up into parallelepipedic shape.

From a supply roll 28 a flattened tubing 29 of synthetic thermoplastic is caused to pass via a loop former 30 upwards across a horizontal turning rod 32 fastened to the upper end of a vertical frame post 31, the tubing being carried from said rod vertical downwards. Immediately below the turning rod 32 a horizontal bracket arm 33 contained in the vertical plane of the turning rod 32 is provided, said arm carrying a sliding shoe 34 at its free end. Between said shoe and the frame post 31 the bracket arm 33 supports a slitting and filling device, designed as a whole by 35, which will be described more closely in the following. The sliding shoe 34 is located within the flattened tubing 29 to engage the longitudinal fold thereof which is remote in relation to the frame post 31, while the slitting device 35 is adapted from the inner side of the tubing 29 to slit open the tubing along the other longitudinal fold thereof. For guiding and stretching the tubing 29 laterally the device 35 and the sliding shoe 34 should be mounted to be mutually resilient transversely in relation to the tubing 29.

The bracket arm 33 furthermore serves as a filling pipe, being connected with a vertical filling pipe 36. The filling pipes 35 and 36 communicate with a supply of liquid or flowing filling material, not shown here.

Immediately below the point where the filling pipe is introduced into the slit-open tubing 29, the latter has its slit-open longitudinal marginal portion carried between a couple of cooperating vertical sealing jaws 37, 38. These jaws are each carried by a leg of a pair of horizontal tongs 39, the joint 40 of which is fixed to the frame post 31 and has its joint axis coaxial with the latter. At their other ends, in relation to the sealing jaws 37 and 38, the tongs 39 are adapted to cooperate with a cam disk 41 which is fixed to a vertical operating shaft 42, which is rotatably mounted in brackets 43 and 44 supported by the frame post 31 and which is driven from a main drive shaft 45 via a bevel gearing 46.

Below the sealing jaws 37 and 38 a horizontal mover clamp 47 is provided slideable along the operating shaft 42 and the frame post 31. The clamp 47 is adapted so as to pinch the tubing at least locally at each longitudinally fold edge of the resealed tubing from both sides of the flattening plane of the latter, and at the same time stretch it transversely in the said plane. For this purpose, the two pinch jaws of the clamp 47 carry two pairs of cooperating pinch cushions 48, 49 and 50, 51, respectively, said two pairs of pinch cushions being operable in the closed position of the clamp 48 each to pinch the tubing along one of the two longitudinal fold edges thereof. The clamp 47 is reciprocably slideable vertically along the frame post 31 and the shaft 42. The sliding movement referred to is transmitted preferably from the shaft 45 by means of a mechanism not shown, while the opening and closing movement of the clamp jaws may be controlled for example by a control cam situated along the vertical path of movement of the clamp 47 but not shown here.

At the lower turning point of the clamp 47 there is provided a pair of tongs 52 fixed along the frame post 31 and the operating shaft 42, which tongs are similar to the pair of tongs 39 before described and thus, like the latter, have their joint 53 fixed to the frame post 31 which is coaxial with the joint axis of the tongs. At the end of the tongs they are adapted to cooperate with a cam disk 54 on the vertical operating shaft 42, while at their other end they carry two cooperating horizontal sealing jaws 55 and 56 which are each carried by one of the legs of the tongs and are adapted between them to sealingly flatten the tubing in the flattening plane thereof and at the same time to cut off the tubing by a transverse cut substantially centrally in the transverse sealing zone.

Parallelepipedic outer shells 58, placed on a conveyor 57, are advanced in the direction of the arrow A. When arriving at a station I the shells are within the operating range of a take-off mechanism which, driven from the main shaft 45, is adapted by means of pusher fingers 60 to move each shell 58 arriving at the station I laterally off from the conveyor 57 and to a station II, at which the extensions of the vertical centre lines of the shell 58 and the resealed tubing substantially coincide, and further to a station III at the other side of the centre line of the tubing 29.

At the station II the shell 58 occupies such a position that the flattening plane of the tubing substantially coincides with a plane through one of the diagonals of the shell opening and through the vertical centre line of the shell 58. Alternatively, the flattening plane of the tubing may be laid in parallel with one of the lateral walls. Furthermore, the shell 58 at this station stands on a platform 61, which is capable of being vertically raised by means of a lever 62 driven from the main shaft 45.

At the station III the shell 58 is closed at its previously open end by means not shown, whereupon it is delivered for example to another conveyor.

The apparatus described above is also detailed in a companion application Serial No. 368,311 filed May 18, 1964, now United States Patent No. 3,314,210 granted April 18, 1967. Compared with the apparatus described in said patent, the present device differs substantially only in respect of the filling device 35 which will now be described more closely.

As mentioned above, the present invention is intended to make the provision of a sterile package, starting from a continuous tubing having a sterile inner side. As a starting material an extruded tube of polyethylene or the like may be used, which gets its initial inner sterility automatically by the high temperature of manufacture and which maintains its sterility by being impervious to bacteria.

The slitting and filling device 35 is provided with an oblique knife edge 63 by means of which one edge of the tubing 29 is slit-open backed up by the sliding shoe 34 located at the inner end of the bracket tube 33 serving as a filling pipe. Immediately after the slitting step the edges obtained are caused to run across a porous body 64 through which the tube 33 extends, the body 64 containing a disinfectant and being outwardly closed by a sealing disk 65 applied to the end face of the body 64. If desired, new disinfectant may be supplied continuously to the body 64 through a conduit, not shown, opening in the interior of the body. In this case the sealing disk 65 prevents this disinfectant from being wasted by running out through the outer end surface of the body. To prevent the disinfectant instead from running out through the inner end surface a similar sealing disk may be used there as well. Preferably, however, an over-pressure is instead used in the tubing, said over-pressure having to be slightly greater than or equal to the pressure at which the disinfectant is supplied. By the inner over-pressure a further advantage is gained, namely that around the body 64 an outward air current is obtained which forms a further barrier to bacteria. Preferably, the porous body 64 and the knife edge 63 are formed so as together with the filling pipe 33 substantially completely to fill the part of the slit which must be opened for the insertion of these members. For example, as shown in the drawing, the body 64 may be given a cross-section of an oval shape which is elongated in the feed direction of the tubing.

In the feed direction of the tubing, after the body 64, a pair of rolls 66 are arranged to close, as rapidly as possible, the opening cut into the tubing, said opening being then positively sealed by means of the sealing jaws 37 and 38. These jaws may be placed more or less far from the edge of the tubing, greater safety against infection being obtained as they are placed farther from the edge, since excess of bacteria may then be permitted within a wider outer zone. However, the degree of utilization of the tubing used must also be taken into consideration.

To ensure the desired sterility still further one may, in contradistinction to what is intended in the example shown, cause the apparatus to operate more or less continuously instead of intermittently, for example, the pressing jaws 37 and 38 together with the pressing rolls 66 may be replaced by continuously operating heat sealing rolls. Then there will be less risk that bacteria are pumped in through the pumping effect which may possibly be obtained by the intermittent working motion.

For the same reason it may also be convenient to replace the intermittently operating pulling clamp 47 as shown by continuously operated feed rolls.

Further modifications are of course also possible within the scope of the invention, as defined by the following claims. For example, the invention is not limited only to the above examples of an apparatus for manufacturing inner bags for packages of a certain kind but may also be applied for example to the manufacture of bag or so called cushion packages without any outer wrapping.

We claim:

1. In an apparatus for making and filling sterile packages from a preformed and generally flattened continuous tube of thermoplastic material whose inner surface is in a sterile condition wherein said tube is fed in a downward direction past a slitting device which slits the tube open along one side edge thereof to accommodate a filling pipe that extends through the slit to the interior of the tubing, wherein said slit-open edge is immediately resealed after passing the location of said filling pipe, and wherein said tubing is sealed transversely at spaced intervals below the resealing point to form individual packages, the improvement wherein a body of porous material is located at the slit-open point of said tubing, said porous body being supplied with a disinfectant which emanates from the surface thereof and the opposite sides of said body being in continuous wiping contact with edge portions of the slit.

2. Apparatus as defined in claim 1 wherein said body of porous material surrounds said filling pipe and a knife edge for producing the slit in said tubing extends upwardly from said porous body.

3. Apparatus as defined in claim 1 wherein said porous body surrounds said filling pipe and has an oval shape which is elongated in the direction of movement of said tubing, and at least the outer end face of said porous body is closed off by a sealing disk which prevents disinfectant from being discharged through said end face.

4. Apparatus as defined in claim 1 wherein an over-pressure of a sterile gas is maintained within said tubing and which causes an outflow of said gas from said tubing in the space between the opposite ends of the slit and said porous body.

5. Apparatus as defined in claim 1 wherein the means for resealing the slit-open edge of said tubing extends further inward towards the axis thereof than does the slitting device thus permitting some excess of bacteria in a narrow outer zone without contaminating the filling material.

6. Apparatus as defined in claim 1 wherein said body of porous material surrounds said filling pipe and a knife edge extends upwardly from said porous body for slitting said tubing, said porous body having an oval shape which is elongated in the direction of movement of said tubing, and at least the outer end face of said porous body is closed off by a sealing disk which prevents disinfectant from being discharged through said end face.

References Cited
UNITED STATES PATENTS

| | | | |
|---|---|---|---|
| 2,616,232 | 11/1952 | Meyer | 53—28 |
| 3,163,971 | 1/1965 | Löliger | 53—28 |

TRAVIS S. McGEHEE, *Primary Examiner.*

E. F. DESMOND, *Assistant Examiner.*